Figure 1:
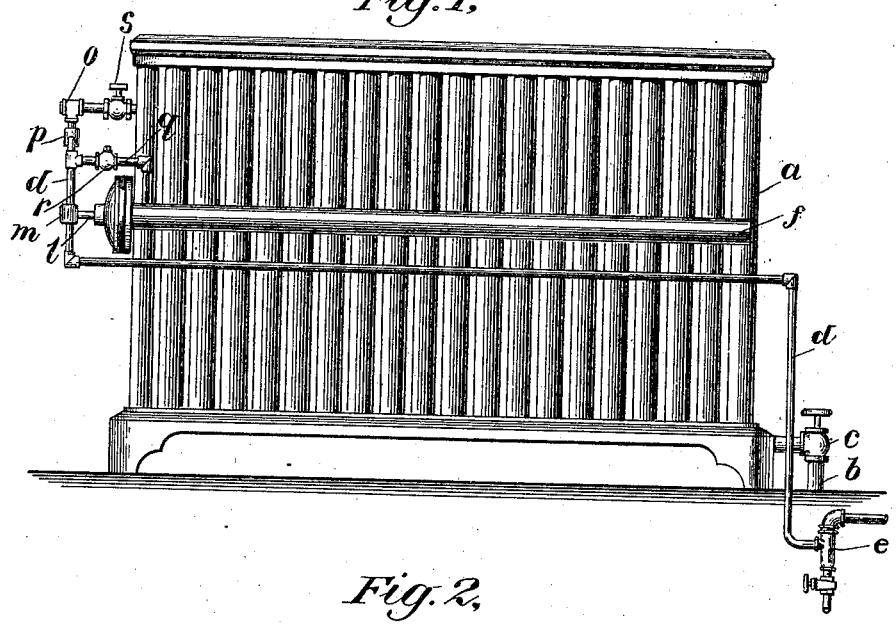

No. 647,023. Patented Apr. 10, 1900.
A. G. PAUL.
HEATING SYSTEM.
(Application filed Apr. 25, 1896.)
(No Model.) 2 Sheets—Sheet 1.

WITNESSES: INVENTOR
Andrew G. Paul,
Fig. 4. BY
Witter & Kenyon
ATTORNEYS.

No. 647,023. Patented Apr. 10, 1900.
A. G. PAUL.
HEATING SYSTEM.
(Application filed Apr. 25, 1896.)
(No Model.) 2 Sheets—Sheet 2.
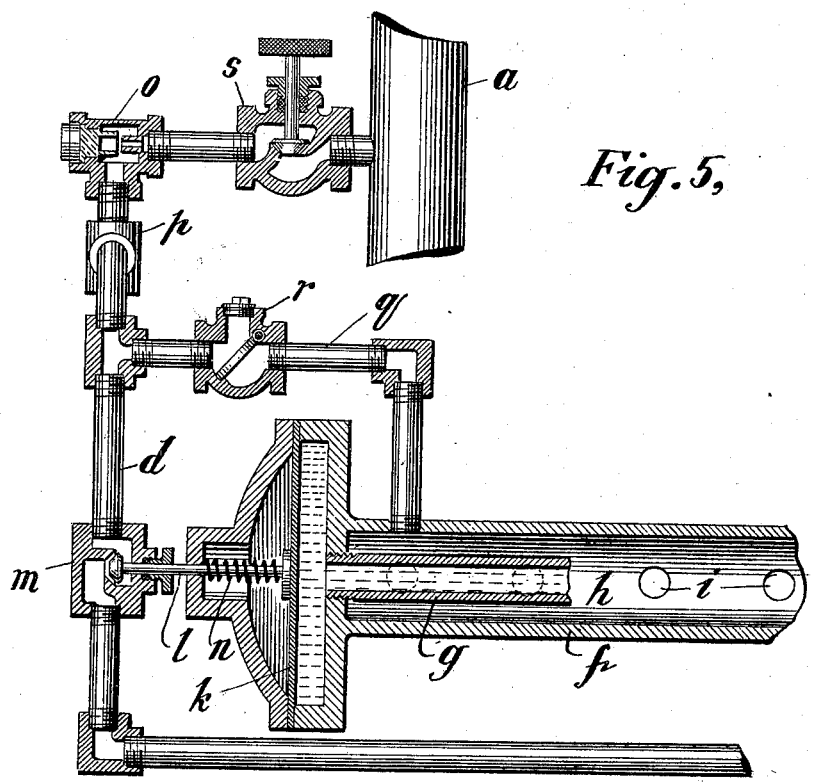
Fig. 5,
Fig. 6,
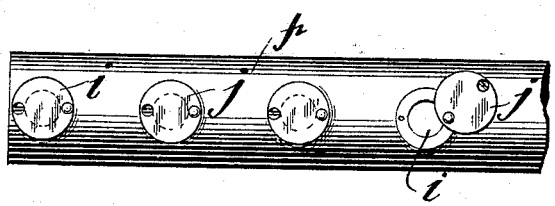
WITNESSES:
Edwin Seger
John O. Templer
INVENTOR
Andrew G. Paul
BY
Kenyon & Kenyon
ATTORNEYS.

UNITED STATES PATENT OFFICE.

ANDREW G. PAUL, OF BOSTON, MASSACHUSETTS.

HEATING SYSTEM.

SPECIFICATION forming part of Letters Patent No. 647,023, dated April 10, 1900.

Application filed April 25, 1896. Serial No. 589,003. (No model.)

*To all whom it may concern:*

Be it known that I, ANDREW G. PAUL, a citizen of the United States, and a resident of Boston, in the county of Suffolk and State of Massachusetts, have invented a new and useful Improvement in Heating Systems, of which the following is a full, clear, and exact specification, reference being had to the accompanying drawings, which form a part hereof.

This invention relates to heating systems in which a pipe or passage is provided for the escape of the air from the heater or radiator or system; and it is especially applicable to a system, such as that shown in the drawings of United States Letters Patent to Skiffington, No. 464,946, of December 8, 1891, wherein there is an air-pipe additional to the supply and return pipe or pipes and an exhauster connected with the air-pipe.

The object of this invention is to automatically control the escape of the air from the radiator or heater or system by means of the heated air given off therefrom or from any selected part thereof, and thereby to regulate the part or extent of the radiator or heater or system from which the air shall be discharged, and which shall thereby be brought into operation and made efficient in the work of heating, and in this way to regulate or adjust the amount of heat furnished by the system.

This invention consists, first, in the combination, with a heater or radiator and the other necessary parts of such a system, of a pipe or passage adapted to permit the escape of air from the radiator or heater or system when the heating vehicle is admitted to the system, and a thermostat comprising an expanding member and an air-chamber around or in proximity to the expanding member adapted to receive the heated air passing off from said heater or radiator or system, the thermostat being connected with the air-pipe, whereby the expanding member of the thermostat will be expanded or contracted by the air passing into the air-chamber and will thereby control the air-pipe.

The invention also consists in so constructing the air-chamber and its connections that it can be connected with different parts of the heater or radiator or system, so as to receive air from any one of said parts.

The invention also consists in the combination, with some or all of the parts above named, of a connecting-pipe connecting the air-chamber of the thermostat with the air-pipe, whereby a current of air can be established through the air-chamber and out through the air-pipe. This part of my invention also contemplates the employment of an exhauster connected with the air-pipe.

The invention also consists in the combination, with the parts already named, of a check-valve on the air-pipe between the radiator and the connecting-pipe that joins the air-chamber and the air-pipe, whereby the air from the air-chamber cannot pass into the radiator. It also consists in combining with the said connecting-pipe a check-valve on said pipe to prevent the air in the radiator from passing through the connecting-pipe into the air-chamber of the thermostat.

The invention also consists of certain other features of construction and combinations of parts hereinafter described and claimed.

The invention is fully illustrated in the accompanying drawings, in which—

Figure 2:
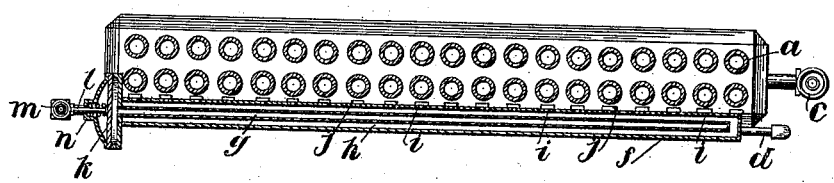
Figure 3:
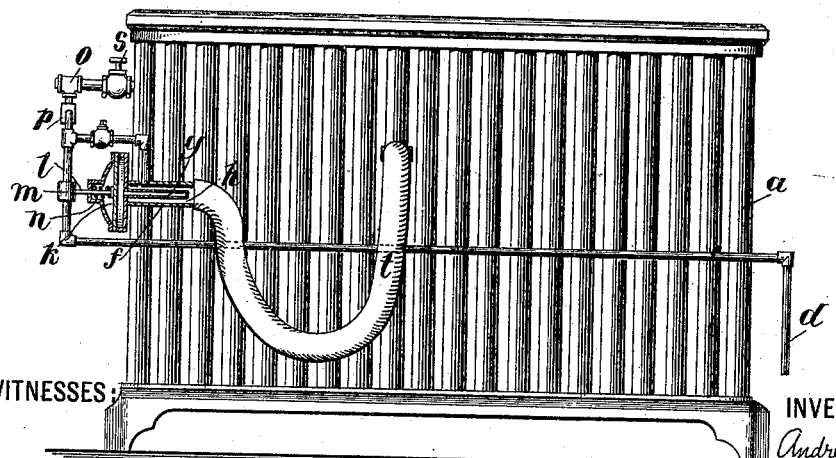

Figure 1 shows a radiator with my improvement applied thereto. Fig. 2 is a horizontal sectional view through the thermostat and radiator. Fig. 3 shows another form of thermostat, having a flexible portion with a clip or catch at its end; and Fig. 4 is a detailed sectional view of the end of this flexible pipe with its fastening-clip. Fig. 5 is a partial sectional view of the thermostat, the air-pipe, the connecting-pipe, and the valves thereon; and Fig. 6 is a detail view of the face of the thermostat next to the radiator, showing the apertures in the wall of the thermostat and the covers for the same.

Referring to Figs. 1, 2, 3, and 4, *a* is an ordinary radiator. *b* is a pipe serving at the same time as the supply-pipe and the return-pipe, the radiator being in the particular arrangement shown connected up on the single-pipe system. A double-pipe system could be equally well employed. *c* is an ordinary valve on the pipe *b*. *d* is an air-pipe, preferably connected with the upper part of the heater, and *e* is an exhauster at the outer end of the air-pipe. I prefer to use a jet of steam or of water as the exhausting device. *f* is a thermostat. It consists of the expanding member $g$, surrounded by the air-chamber $h$. The air chamber or space is formed between the outer wall of the thermostat and the expanding member. It extends across the radiator and is provided with apertures $i\,i$ opposite the different tubes of the radiator, adapted to admit heated air to the air-chamber. Each of these apertures has a cover $j$, adapted to be moved so as to open or close the aperture, and thus permit or prevent the admission of air at that point. These covers can be pivoted to the wall of the thermostat or fastened in place in any other suitable manner. The expanding member $g$ can be greatly varied in form and construction. In the form shown it consists of a tube opening into an enlarged space on one side of the diaphragm $k$, this tube and enlarged space being filled with some suitable expanding material, such as a more or less volatile liquid or linseed-oil. The diaphragm $k$ is attached on its other side to the spindle $l$ of an ordinary valve $m$ in the air-pipe. A coiled spring $n$ is placed around the valve-spindle to open the valve or assist in opening it when the member $g$ contracts. The air-pipe is provided with an ordinary thermostatic valve $o$ and a check-valve $p$ to prevent air from passing back into the radiator. $q$ is a connecting-pipe joining the air-chamber of the thermostat with the air-pipe. This pipe is provided with a check-valve $r$ to prevent air from passing back into the thermostat $f$. The air-pipe is preferably provided with an ordinary shut-off valve or cock $s$.

The operation of this device is as follows: When the system is started and the steam or other heating agent is admitted to the system, the air, with which the radiator is full, passes out through the air-pipe. When an exhauster is used, the decreased pressure produced thereby in the air-pipe causes the air in the radiator to flow into the air-pipe. When no exhauster is used, the discharge of the air is dependent upon the pressure on the supply side. The amount of steam that can enter the radiator is dependent upon the amount of air that escapes therefrom. If the operator wishes to put into operation only three tubes of the radiator, he opens the aperture $i$, which is opposite the third tube, by moving or swinging the cover $j$ back from its closed position. The other apertures $i\,i$ are left shut. When the steam reaches the third tube, that tube is heated and heat is thereby imparted to the surrounding air. This heated air passes through the aperture $i$ and into the air-chamber $h$ of the thermostat and heats the member $g$. That member expands and thereby moves the diaphragm $k$ and the spindle or valve-stem $l$ and closes the valve $m$ in the air-pipe. No more air can escape from the radiator. Hence the steam cannot enter any farther into the radiator. In this way the heated air passing off from the radiator operates the thermostat and through it the air-pipe.

In the best form of my invention I employ an exhauster in connection with the air-pipe, as already described. This exhauster causes a strong current of air to be established through the aperture $i$, air-chamber $h$, connecting-pipe $q$, and air-pipe $d$, which causes the heated air to pass more rapidly into the air-chamber, and thereby increases the efficiency and accuracy of operation of the system. The check-valve $r$ prevents any air from passing backward through the pipe $q$ into the thermostat, which might happen in case the exhauster were not in use and there was an excess of pressure in the radiator. The check-valve $p$ on the air-pipe prevents air from passing back into the radiator through the air-pipe. The thermostatic valve $o$ on the air-pipe operates in the well-known manner to prevent the escape of steam.

I prefer to make the outer wall of the thermostat of non-conducting material or to coat it with such material, so that no substantial amount of heat will be conducted through the wall itself to the contents of the air-chamber; but the heat will be conveyed to the expanding member only by the heated air entering one of the apertures $i$.

In Figs. 3 and 4 I have shown the preferred form of my invention. It is similar to the form shown in Figs. 1 and 2, except that the expanding member is made much shorter and the outer tube of the thermostat is provided with a flexible end portion $t$ and has only one aperture—namely, at its end. The end of the tube is provided with a clip or fastening device $u$, as shown in Fig. 4, adapted to be slipped onto any tube of the radiator. The operation is the same as has been already described, except that instead of opening an aperture $i$ in the wall of the thermostat opposite the tube selected the end of the thermostat is brought against or near the particular tube of the radiator desired and fastened in that place by the clip $u$. The heated air passing off from the radiator-tube enters the opening at the end of this flexible tube and passes around the member $g$ and imparts heat to it, and thereby controls the air-pipe, as already explained. Any form of clip or fastening device can be employed.

By the use of my improvement the extent to which the radiator is put into use can be easily and accurately regulated and the amount of heat furnished by the system easily and accurately controlled. The expanding member is itself stationary, which reduces the liability of its getting out of order. The thermostat is so arranged as to respond very quickly to any changes of temperature in the part of the system with which it is connected. The apparatus is simple and economical.

Having fully described my invention, what I claim as new, and desire to secure by Letters Patent, is—

1. The combination with a heating system, of an air-pipe for removing air therefrom, and a thermostat consisting of an expanding member and an air-chamber in proximity to said member adapted to receive the heated air passing off from said heating system, the thermostat being connected with the air-pipe and adapted to control the same, substantially as set forth.

2. The combination with a heating system, of an air-pipe for removing air therefrom, a valve controlling said air-pipe, and a thermostat consisting of an expanding member and an air-chamber in proximity to said member adapted to receive the heated air passing off from said heating system, the thermostat being connected with the valve on the air-pipe and adapted to control the same, substantially as set forth.

3. The combination with a heating system, of an air-pipe for removing air therefrom, a valve controlling said air-pipe, and a thermostat consisting of an expanding member and an air-chamber in proximity to said member adapted to be connected with different parts of the heating system and to receive the heated air therefrom, the thermostat being connected with the valve on the air-pipe and adapted to control the same, substantially as set forth.

4. The combination with a heater or radiator, of an air-pipe for removing air therefrom, a valve controlling said air-pipe, a thermostat consisting of an expanding member and an air-chamber in proximity to said member adapted to be connected with different parts of the heater or radiator and to receive the heated air therefrom, the thermostat being connected with the valve on the air-pipe and adapted to control the same, and a pipe connecting the air-pipe and the air-chamber of the thermostat, substantially as set forth.

5. The combination with a heater or radiator, of an air-pipe for removing air therefrom, an exhauster connected with the air-pipe, a valve in the air-pipe and a thermostat consisting of an expanding member and an air-chamber in proximity to said member adapted to be connected with different parts of the heater or radiator and to receive the heated air therefrom, the thermostat being connected with the valve on the air-pipe and adapted to open or close the same, and a connecting-pipe connecting the air-pipe and the air-chamber of the thermostat, substantially as set forth.

6. The combination with a heater or radiator, of an air-pipe for removing air therefrom additional to the supply and return pipe or pipes, an exhauster connected with the air-pipe, a valve in the air-pipe and a thermostat consisting of an expanding member and an air-chamber in proximity to said member adapted to be connected with different parts of the heater or radiator and to receive the heated air therefrom, the thermostat being connected with the valve on the air-pipe and adapted to open or close the same, and a connecting-pipe connecting the air-pipe and the air-chamber of the thermostat, and a check-valve on the air-pipe between the connecting-pipe and the heater or radiator, substantially as set forth.

7. The combination with a heater or radiator, of an air-pipe for removing air therefrom additional to the supply and return pipe or pipes, an exhauster connected with the air-pipe, a valve in the air-pipe and a thermostat consisting of an expanding member and an air-chamber in proximity to said member adapted to be connected with different parts of the heater or radiator and to receive the heated air therefrom, the thermostat being connected with the valve on the air-pipe and adapted to open or close the same, and a connecting-pipe connecting the air-pipe and the air-chamber of the thermostat, and a check-valve on the air-pipe between the connecting-pipe and the heater or radiator and a check-valve on said connecting-pipe, substantially as set forth.

8. The combination with a heater or radiator, of an air-pipe for removing air therefrom additional to the supply and return pipe or pipes, a thermostatic valve on the air-pipe, an exhauster connected with the air-pipe, a second valve in the air-pipe and a thermostat consisting of an expanding member and an air-chamber in proximity to said member adapted to be connected with different parts of the heater or radiator and to receive the heated air therefrom, the thermostat being connected with the second valve on the air-pipe and adapted to open or close the same, and a connecting-pipe connecting the air-pipe and the air-chamber of the thermostat, and a check-valve on the air-pipe between the connecting-pipe and the heater or radiator, substantially as set forth.

9. The combination with a heater or radiator and an air-pipe for removing air therefrom additional to the supply and return pipe or pipes, and an exhauster connected with the air-pipe and a valve on the air-pipe, of a thermostat consisting of the expanding member $g$, and the air-chamber $h$ and the flexible portion $t$ adapted to connect the air-chamber with different parts of the heater or radiator, the expanding member of the thermostat being connected with the valve on the air-pipe, substantially as set forth.

10. The combination of the radiator $a$, the air-pipe $d$, the exhauster $e$, the valve $m$, the thermostat $f$ consisting of the expanding member $g$ and the air-chamber $h$ and connected with the valve $m$, the flexible portion $t$, and the fastening device $u$, substantially as set forth.

In testimony whereof I have signed my name to this specification in the presence of two subscribing witnesses.

ANDREW G. PAUL.

Witnesses:
 EDWIN SEGER,
 GEO. W. MILLS, Jr.